(12) United States Patent
Smowton et al.

(10) Patent No.: US 9,152,868 B2
(45) Date of Patent: Oct. 6, 2015

(54) PERSONAL IDENTIFICATION COMBINING PROXIMITY SENSING WITH BIOMETRICS

(75) Inventors: Christopher Stephen Frederick Smowton, Cambridge (GB); Ronnie Chaiken, Redmond, WA (US); Weidong Cui, Redmond, WA (US); Oliver H. Foehr, Bellevue, WA (US); Jacob Rubin Lorch, Bellevue, WA (US); David Molnar, Seattle, WA (US); Bryan Jeffrey Parno, Seattle, WA (US); Stefan Saroiu, Redmond, CA (US); Alastair Wolman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 792 days.

(21) Appl. No.: 13/429,261

(22) Filed: Mar. 23, 2012

(65) Prior Publication Data
US 2013/0251216 A1 Sep. 26, 2013

(51) Int. Cl.
*G06K 9/00* (2006.01)
*H04L 9/32* (2006.01)
*G06K 9/62* (2006.01)
*G06K 9/68* (2006.01)
*H04W 12/06* (2009.01)

(52) U.S. Cl.
CPC .......... *G06K 9/00912* (2013.01); *G06K 9/6293* (2013.01); *G06K 9/6807* (2013.01); *H04L 9/3231* (2013.01); *H04L 2209/56* (2013.01); *H04L 2209/80* (2013.01); *H04W 12/06* (2013.01)

(58) Field of Classification Search
USPC .................................................. 382/115–118
See application file for complete search history.

(56) References Cited

U.S. PATENT DOCUMENTS

| | | | |
|---|---|---|---|
| 7,043,754 B2 * | 5/2006 | Arnouse ........................ 726/20 |
| 2003/0163710 A1 * | 8/2003 | Ortiz et al. ................... 713/186 |
| 2008/0172733 A1 * | 7/2008 | Coriaty et al. ................. 726/19 |
| 2011/0076988 A1 * | 3/2011 | Zigman et al. ................ 455/411 |
| 2013/0006425 A1 * | 1/2013 | Bell et al. ....................... 700/275 |
| 2013/0312018 A1 * | 11/2013 | Elliott et al. .................... 725/12 |
| 2015/0006224 A1 * | 1/2015 | Arditi et al. ................. 705/7.23 |
| 2015/0031393 A1 * | 1/2015 | Post et al. .................. 455/456.2 |

* cited by examiner

*Primary Examiner* — Wesley Tucker
(74) *Attorney, Agent, or Firm* — Judy Yee; Micky Minhas (57) ABSTRACT

Described is a technology by which the identity of a person (e.g., a customer in a commercial transaction) is determinable without active identification effort, via biometric data is obtained without action by the person. Machine processing of the biometric data over a set of possible persons, determined from secondary proximity sensing, is used to determine or assist in determining the identity of the person.

20 Claims, 6 Drawing Sheets

PERSONAL IDENTIFICATION COMBINING PROXIMITY SENSING WITH BIOMETRICS

BACKGROUND

There are many situations in which it is desirable to identify a person. For example, many forms of payment today require customers to provide a form of authentication to a store, e.g., when paying with a credit card, the customer needs to be able to reproduce the signature found on the back of the card. This constitutes a weak form of identification. If the transaction has a high monetary value, the customer may be required to provide additional forms of identification, such as a driver's license. Similarly, employers may issue "food cards" to their employees that serve to authenticate the employees when making a purchase, and link their identity to an account from which money for the purchase can be deducted.

Card presentation and verification schemes, along with checking signatures and/or government-issued photo IDs, are subject to errors on the part of the merchant's clerk or the like. Such schemes also require non-negligible effort on the part of the customer, e.g., remembering to bring a card, a photo identifier, carefully signing and so forth.

A different to ascertain a person's identity is through the use of biometrics, including face recognition, retinal and/or iris scanning, fingerprint reading, voice identification and so forth. However, many forms of biometrics are invasive; for example, it is not reasonable to ask an employee to subject himself or herself to short-range iris scanning to buy lunch, (nor is it currently practical from an expense and maintenance perspective). At the same time, contemporary non-invasive types of biometrics such as face recognition technology are not sophisticated enough to provide the level of accuracy that is needed for a payment scheme.

What is desirable is an identification scheme that requires virtually no effort on the part of the identified person. At the same time, to be useful such a scheme needs to be reasonably practical, non-invasive, secure and accurate.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which identity-related information is provided, including by obtaining sensed proximity-based data corresponding to a first set of one or more user devices and obtaining sensed biometric data corresponding to a second set of one or more users. The proximity-based data is used to reduce a set of candidate persons having stored biometric data to a reduced subset. Machine recognition is performed that evaluates the sensed biometric data against stored biometric data of candidate persons in the reduced subset, to produce a final candidate set corresponding to at least one candidate person's identity.

In one aspect, a proximity sensing mechanism senses identifying information from one or more user devices within range of the proximity sensing mechanism. A biometric sensing mechanism senses biometric data of one or more users. A processing mechanism is configured to provide the device identity information and the biometric data to an identification service that machine recognizes the biometric data into a candidate set corresponding to at least one candidate, including by using the device identity information to assist in the recognition. The processing mechanism receives the candidate set and outputs information corresponding to the candidate set.

In one aspect, the identity of a customer in a commercial transaction is determined without active identification effort by the customer. Biometric data is obtained from the customer without action by the customer directed towards providing the biometric data. A set of possible proximate customers is obtained based upon secondary sensing. Machine processing of the biometric data over the set of possible customers is used to determine or assist in determining the identity of the customer.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a biometrics-based zero-effort or near zero-effort identification scheme in which a user need not exert any effort to specifically identify himself or herself. This may be in a payment scheme where the identification scheme is used to complete a transaction.

As will be understood, the technology increases the accuracy of biometric recognition (e.g., face recognition) via additional techniques/heuristics that match the identification scenario. One technique is to reduce the pool of potential customer identities (candidates) given to the biometric recognition algorithm. This may be done via proximity sensing of the candidates, for example, by using short-range radios, e.g., Bluetooth® or Bluetooth® Low Energy (BLE), found in contemporary commodity mobile devices to identify which persons (e.g., customers) are physically nearby a location (e.g., a point-of-sale terminal).

Further, the biometric recognition algorithm may produce a reduced pool of candidate identities, rather than one definitive identity, and then use a second process to select the final identity from this smaller candidate pool. For example, a human (e.g., a cashier) may select the correct match from a small pool of candidate customers narrowed by the biometric recognition algorithm.

Still further, there is described the video recording and maintenance of biometrics-based transactions, which provides strong evidence to assist in resolving any payment disputes.

It should be understood that any of the examples herein are non-limiting. For instance, many of the examples are directed towards an in-person commercial transaction in which identification is part of the payment process, however any other scenarios in which personal identification is desirable may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and identification in general.

Figure 1:
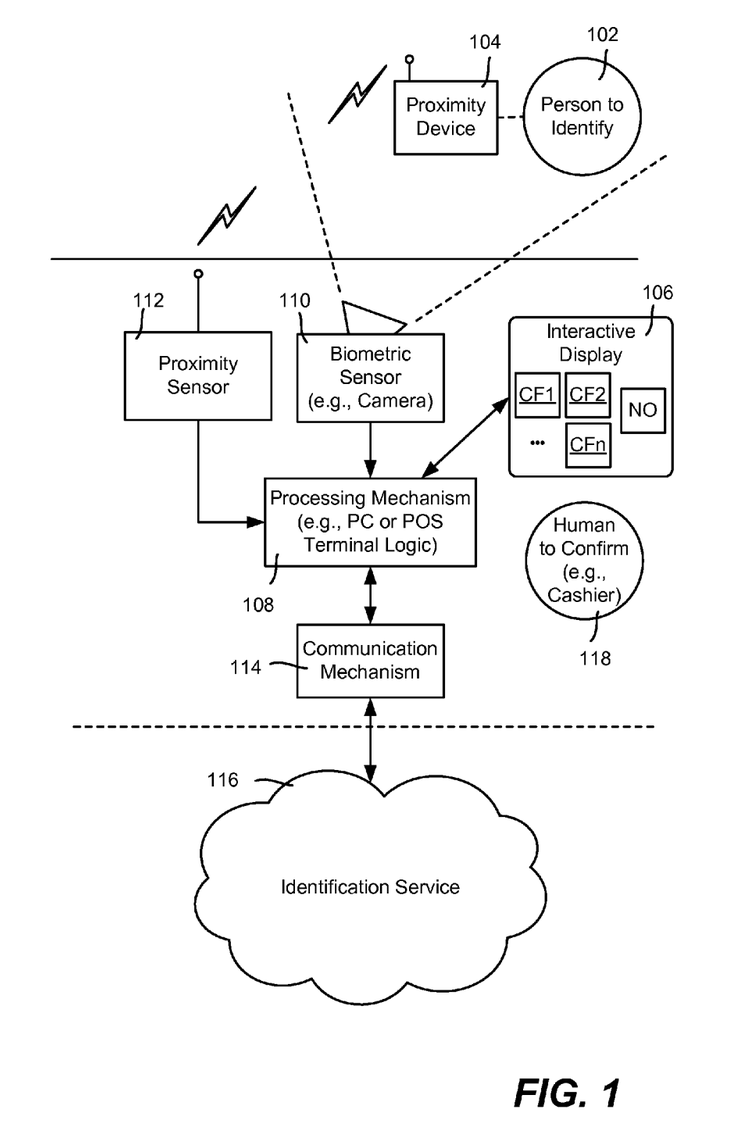
FIG. 1 is a block diagram showing example components of a system configured to provide biometric-based identification information for a person according to one example implementation.

FIG. 1 is a block diagram showing an example system for biometric-based identification. In general, a person to identify 102 (a user) carries or is otherwise associated with a proximity device 104, such as a cell phone equipped with short-range wireless communication. Note that users who want to participate in the system enroll (pre-register their information) with the system as described below.

At a location where identification is desired, such as a store counter equipped with a point-of-sale terminal (e.g., comprising an interactive display 106 and a processing mechanism 108), a biometric sensor 110 is provided that senses information regarding the person to identify 102. Other identification scenarios include determining who a potential customer is (e.g., to prepare a food or drink order based on customer data before the customer actually orders), personalizing car seat and mirror settings based upon the driver, which also can add security, customizing a user's computer or viewing experience (e.g., based on which person is currently in front of a kiosk or a family personal computer), and so on.

One example of a non-intrusive a biometric sensor is a camera used for capturing video, which may be processed via facial recognition techniques as described below. Note that face recognition corresponds to one biometric property that can be machine recognized with adequate accuracy rates using the technology described herein, is difficult to spoof without being detected during a payment transaction, and is not invasive.

Other examples of non-intrusive a biometric sensors that provide properties for machine recognition include mechanisms that can capture retinal/iris data at a relatively long range distance, skeletal data using a depth-camera, or one or more microphones configured to capture data suitable for use in voice-based identification (voiceprinting). More particularly, current research is directed towards extending the range of iris scanning. Voice-based identification currently needs relatively long voice samples to provide high accuracy rates, however in certain scenarios and as technology advances, short statements made as a natural part of conducting a transaction may be sufficient to identify a person.

To increase accuracy as described herein, a proximity sensor 112 detects when one or more personal devices are within a certain distance to the identification location. By way of example, if the number of potential persons is narrowed to only those who are close to the sales counter, facial recognition may be limited to those candidates only, whereby accuracy is sufficiently high for many (or most) types of commercial transactions. Thus, the proximity data may correspond to a list of one or more unique identifiers (IDs) of who is in range of the proximity sensor. Note that the proximity data may include some concept of a time window or the like, e.g., if a person's ID has been recently sensed as being in range but has just "disappeared" from sensing, that person may be included in the list of sensed IDs for some period of time afterwards, e.g., using a decay function or the like.

One example proximity sensing technique is based upon having the proximity device 104 and the proximity sensor 112 use continuous scanning using short-range radios such as Bluetooth® or Bluetooth® Low Energy (BLE). This allows identifying the customers in the vicinity of the transaction. Near-field communication, RFID, Wi-Fi (e.g., to a nearby access point), GPS (e.g., with the current coordinates sent by the device to the processing mechanism directly or remotely) and/or other short-range technologies may be used to provide the proximity data. The proximity detection schemes may be combined, e.g., most users may use Bluetooth® communication, but a user that forgot his device may be wearing an RFID tag which suffices. As is understood, any of these proximity schemes assists the biometrics identification scheme by considering only the identities of people identified through such short-range radio scanning.

Thus, in FIG. 1, the proximity data and biometric sensed data is collected at the processing mechanism 108, such as a personal computer or added as part of the point-of-sale terminal logic. The processing mechanism 108 packages the sensed proximity and biometric data (e.g., a set of nearby persons as identified by Bluetooth® communication and a short video of the person). This data is communicated via a communications mechanism 114 to an identification service 116, e.g., securely over the Internet or an intranet.

In general and as further described below, the identification service 116 processes the sensed proximity and biometric data and returns a result that may be used to identify the person. For example, a video clip (e.g., beginning some amount of time before the transaction process started) is disassembled into a sequence of frames that are sent to a back-end processing system, which performs the face recognition. In one implementation described below, the back-end system comprises a cluster of computers with sufficient power to keep up with the computational needs of face recognition algorithms.

In one implementation, the returned recognition results may be in the form of one or more candidates, such represented by images in the form of candidate faces (CF1-CFn). These candidate faces may be displayed on the interactive display 106 that is coupled to the processing mechanism 108, e.g., the user interface of a point-of-sale terminal. A typical result may be four candidates ranked in order of likelihood. A human 118 (such as the cashier) may then view the images of the candidates against the actual, live person to identify, and interact with the display 106 to confirm a matching one. This technique reduces the rate of false identification as well as intentional fraud. Note that the human 118 (the confirmer) that confirms need not be physically present, e.g., the live camera shot along with the images may be sent to a remote location where the confirmation is made (or not made).

By way of example, in one implementation the top four potential biometric recognition matches are displayed on a tablet facing the cashier. The cashier is then asked to select the "true" identity of the person making the payment. If none of the four pictures shown matches the customer, the cashier can select a button showing "No matches," which basically results in canceling the biometrics-based payment and asking the user to either register in the system and/or pay through other means. Alternative schemes are possible, such as showing an additional page of four more faces at that point.

Note that the above scenario only works for persons who enroll with the service and have a suitable proximity device at the time of identification. In the event no candidate matches the person to identify 102, other actions such as to have the cashier request an existing alternative payment scheme may be used. However, for many people, participation is desirable, as it provides for forms of payment that require no active identification effort from the customer. For example, the customer may merely present his or her goods to the cashier, and after the cashier rings up the total, the customer may walk away. At no point does the customer need to interact with a device or perform additional identification tasks such as to present a payment card.

Figure 2:
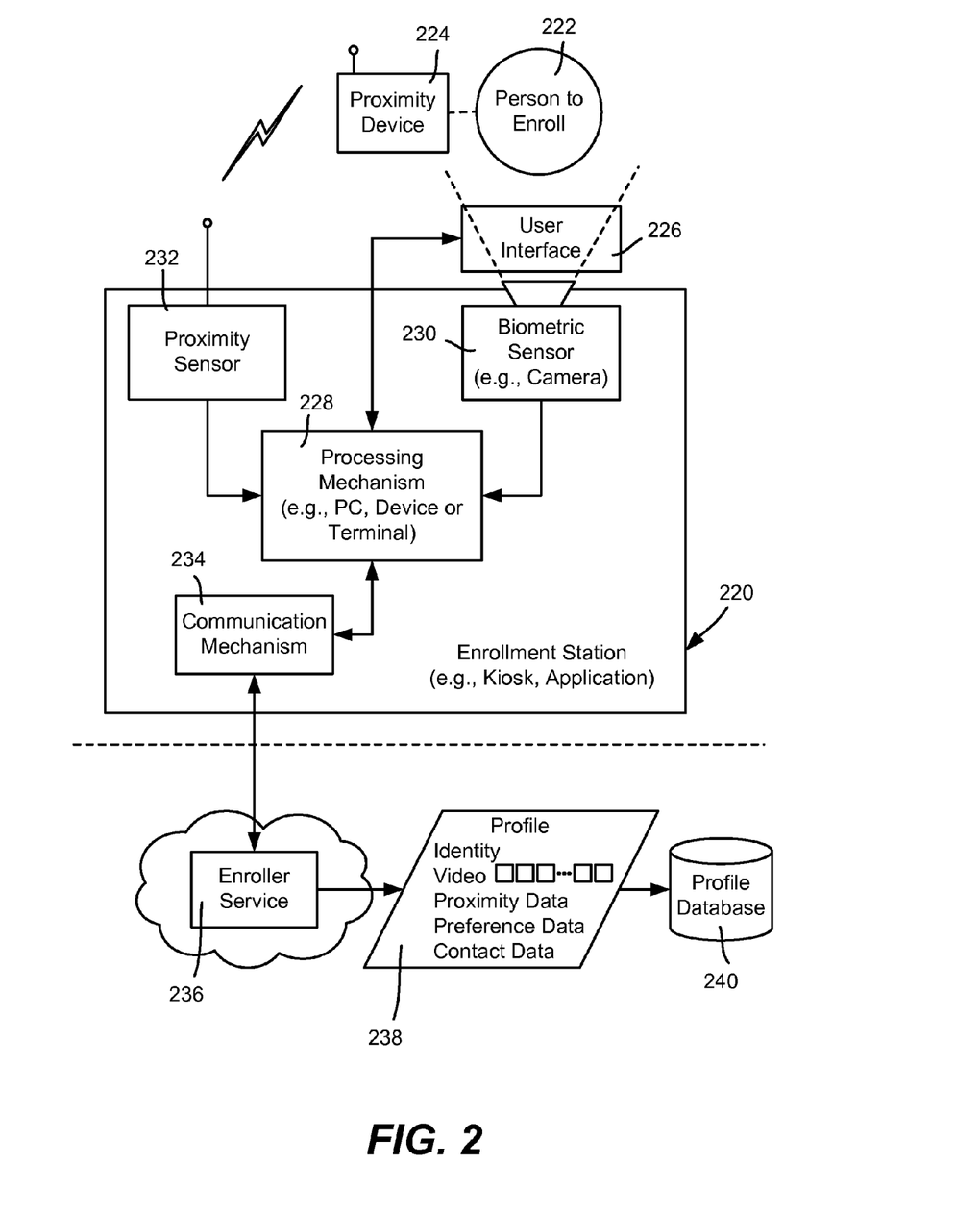
FIG. 2 is a block diagram showing an example enrollment system by which a user registers information with a biometric-based identification service, according to one example implementation.

With respect to enrollment, FIG. 2 shows example components used in example enrollment operation. Enrollment may be accomplished at a kiosk, via a user device application, at home via a properly equipped personal computer, at work when a user is issued an ID badge, and so on. These and other ways to enroll are exemplified in FIG. 2 via an enrollment station 220. Note that enrollment is based upon a trusted mechanism for authentication, e.g., no matter where the enrollment is done, the personal identity that is associated with the biometric data, the device ID, and the payment method needs to be trusted.

In general, the operation of the enrollment station 220 is similar to the purchase scenario of FIG. 1. The person to enroll 222 has a proximity device 224, however instead of an identifying entity such as a cashier, the person to enroll operates a user interface 226 that is coupled to the processing mechanism 228.

A biometric sensor 230 captures a biometric representation of the person to enroll 222, such as a short video (e.g., around twenty seconds) for a facial recognition-based biometric scheme. A proximity sensor 232 collects the proximity data from the proximity device 224 that will be similarly sensed for actual identification (in normal usage, following enrollment). Note if a cell phone or other such device is being used as the enrollment station 220, and also acts the proximity device, the already-known device proximity data such as Bluetooth® identification data (rather than sensed information) may be collected at the processing mechanism 228.

A communication mechanism 234 sends the enrollment-related data to an enroller service 236, which may be part of the overall identification service, or coupled thereto. The enroller service 236 records profile data 238 for this user in a profile database 240, e.g., along with the profile data of other users. As can be seen, the exemplified profile data includes some identity data such as the person's name, the video and proximity data that was captured, user preference data (e.g., credit cards, checking accounts, a coffee order, and so forth) and contact data such as an email address of the user. The user may enter any appropriate alphanumeric data via the user interface 226, as well as possibly other data such as a credit card number and related data by swiping it into a reader that is part of the user interface 226. Note that any of the data may be reformatted, compressed and so forth for database storage. For example, if facial recognition is based upon feature matching, features of the video frames may be stored instead of the actual video frames, along with a face gallery or the like that maintains the face images instead of background images, for example.

Note that much of the enrollment may be assisted by the cashier, e.g., whenever a non-enrolled user asks to register in the system. The cashier presses a button that records a biometric sample (e.g., a short video of the customer) and asks for the customer's identity and forms of payments to be entered into the system; this may already be known, such as if the customer has paid first. The system automatically creates the biometric profile (e.g., the customer's face image gallery from the video and links the customer's identity and payment options with his or her biometric.

Figure 3:
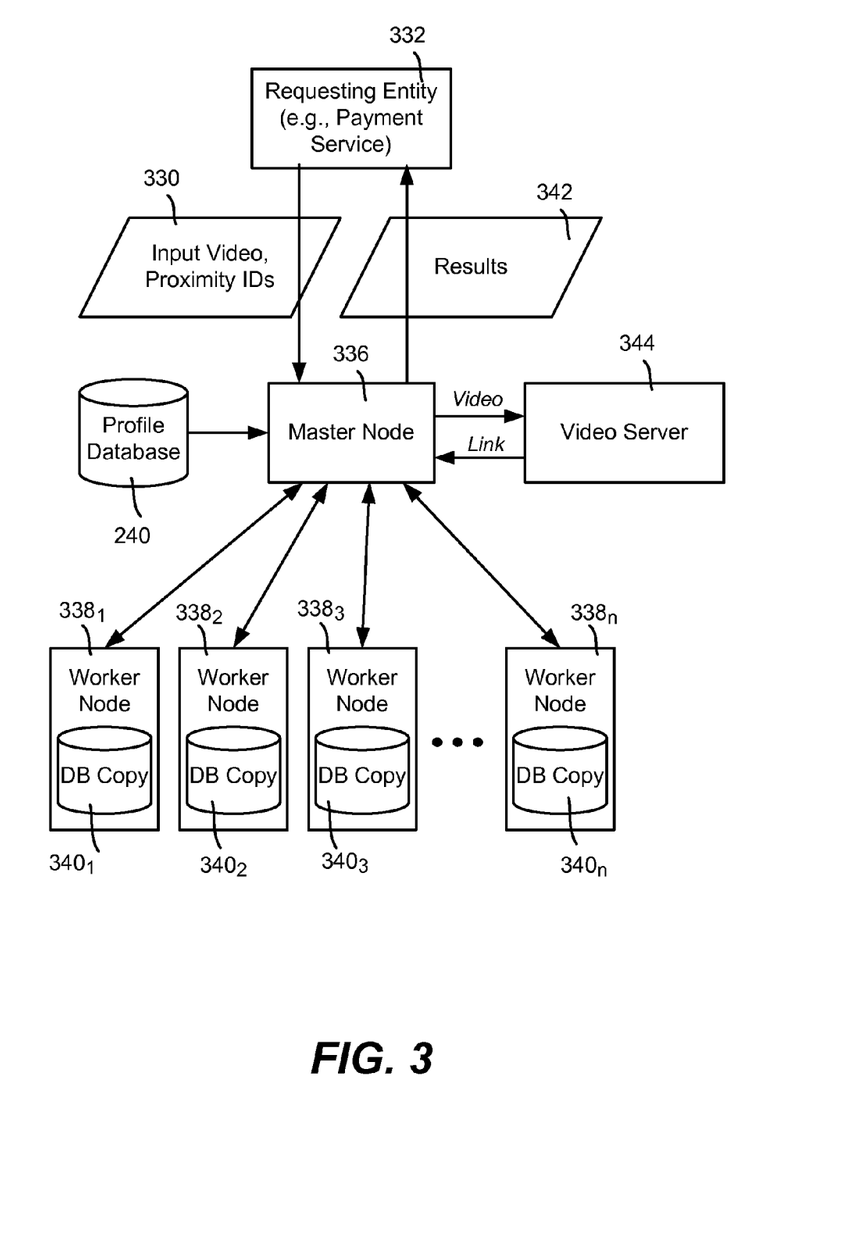
FIG. 3 is a block diagram representing example steps that may be taken to parallel process video frames to perform facial recognition, according to one example implementation.

Turning to actual on-demand "online" identification in an example face-recognition based biometric identification scenario, FIG. 3 shows example components for a processing video and sensed proximity data 330 from a requesting entity 332 such as the merchant/a payment service to find one or more matching candidates. As will be understood, via a master node 336 and a plurality of worker nodes $338_1$-$338_n$, highly-parallelizable back-end processing is used to provide desirable performance in biometric recognition. For example, the face recognition task may be parallelized in two ways, namely temporal and spatial.

In temporal parallelization, each individual frame is placed into a queue by the master node 336. Each worker node $338_1$-$338_n$ in the cluster, when free, reads a frame from the queue and proceeds with face recognition against the stored profile data; each worker node has a copy 340-$340_n$ of the profile database (or access to a copy if a shared database facilitates fast enough access), which may be updated from the profile database via known replication techniques.

In spatial parallelization, each individual frame is split into overlapping sub-frames. Each sub-frame is put in the queue and processed the same way as above. The sub-frames overlap in such a way that all faces (there may be multiple faces in a frame) appear in at least one sub-frame, which means that the overlapping region needs to be wider than the width of the largest face that is likely to be encountered; (note that determining this is relatively easy as a good estimate on how far the camera is from the customer is known).

Note that one frame may be dequeued and processed by one worker node, for example. Because the frames differ over time and/or space, at least some of the worker nodes may obtain different recognition results from others. As described above, recognition may be limited to only those user profiles for whom proximity was also sensed.

Each worker node that participates provides individual recognition results to the master node 336, such as a ranked list of who was identified. The master node 336 processes the individual results into final results 342, such as a final candidate set comprising one or more candidates, e.g., four ranked candidates represented by images as described above, using any of well known combining (e.g., voting based, weighting-based) algorithms, heuristics and/or the like. The final results 342 are returned to the requesting entity 332, which may use them in any suitable way, e.g., to present to a cashier for selection of one (or none).

In addition to providing the identification scheme, the above system may implement a mechanism for auditing identification, such as for biometric identification-based payments. By way of example, each transaction may be video recorded in such a way that the video captures the customer's face, the goods purchased, as well as the transaction amount. The video clip (spanning from some duration before and after the transaction, which may vary based on heuristics or the like) is stored in a video server 344 in conjunction with data that identifies the transaction, with a link (or possibly the video itself) automatically sent to the customer's registered contact point (e.g., email address) and the merchant (and/or possibly a third party such as an auditing service or a credit card company or the like) once the transaction completes. This video can serve as evidence for disputing a transaction.

For example, a customer who disputes making the transaction at all may use the video to argue that the biometric identification was incorrect and that someone else made the transaction. As another example, a customer unhappy with the amount charged can use the video's recorded transaction to dispute the amount.

In one implementation, the video and audio of every transaction is recorded and stored encrypted at the payment system administrator. If a user wishes to dispute a transaction attributed to him, he can do so, at which point the video is retrieved and audited. Links to these resources, as well as information about the transaction may be transmitted to the user as an e-receipt, which may be accessible on the user's mobile device or the like. If the video shows the user not present, or shows the user conducting a transaction for a different amount than what was charged, then remedial action is taken (e.g., a full or partial refund is granted) as appropriate.

Turning to additional privacy and security aspects, the Bluetooth® Low Energy protocol (BLE) present in the Bluetooth 4.0 specification permits fast discovery of devices without incurring unreasonable power use on the devices. Thus, users may be willing to leave their devices in a discoverable mode, because doing so does not significantly reduce its battery life. By encoding enough identifying information into the device advertisement communication, no explicit discovery procedure is required. The vendor's device, by listening to these advertisements, learns the identities of nearby customers, and can then use these signals to aid the cashier in selecting the customer as described above.

However, privacy considerations may make some customers unwilling to continually broadcast their device-unique identifier because it may be used to identify a user to anyone in range. Described herein is having each advertisement contain a unique encryption of the identifier. More particularly, for every broadcast, the customer's device computes a random nonce, appends the identifier, encrypts the combination with the public key of the payment system administrator (e.g., the credit card company or employer), and broadcasts that in the advertisement. A vendor can only identify such a customer by submitting this encrypted string to the payment system administrator and asking for it to be decrypted. Because vendors incur some costs and checks to participate in this program, and because a vendor's participation can be revoked in the case of malfeasance, it is reasonable to restrict access only to vendors. Any entity who listens to the device's encrypted transmissions, and who is not authorized to decrypt them, sees only random information and cannot use this information to identify a user, or even to determine whether two broadcasts come from the same or different users.

Limitations of this encryption-based scheme include power use and advertisement size, e.g., if the user's device does not have power-efficient cryptographic circuitry, it may consume unreasonable power to compute a new encryption every advertisement period. Also, if the device has a lot of data to advertise for other purposes, there may not be enough room in the advertising beacon to fit an encrypted identifier. To solve such problems, the protocol may be divided into an advertisement phase and a secondary phase. In the advertisement phase, the device advertises a random identifier that changes often, e.g., once every few minutes. When a vendor's system wants to learn a device's identity, it uses the advertisement to learn how to connect to the device, connects to the device, and requests it to produce and provide an encryption of the user's identifier. This solves the power problem, because encryption is only done when in the presence of a vendor who has not recently learned the identity. It also solves the advertisement beacon size problem, because the encrypted content is not in the beacon.

Challenge-response protocol concepts may be used, e.g., in the above secondary phase, such as to prevent replay attacks. To avoid "wormhole" (radio relay-based), response time may be measured to accomplish distance bounding.

As an additional privacy-enhancing measure, a customer may restrict the payment system administrator to only reveal his or her identity to select vendors. The user may select the vendors authorized to decrypt the beacons in various ways, e.g., by telling an administrator with which vendors he wants to share. As another example, while interacting with a vendor not yet granted permission, a user may use the user interface on his device to give a limited-duration capability to the currently interacted-with vendor.

Figure 4:
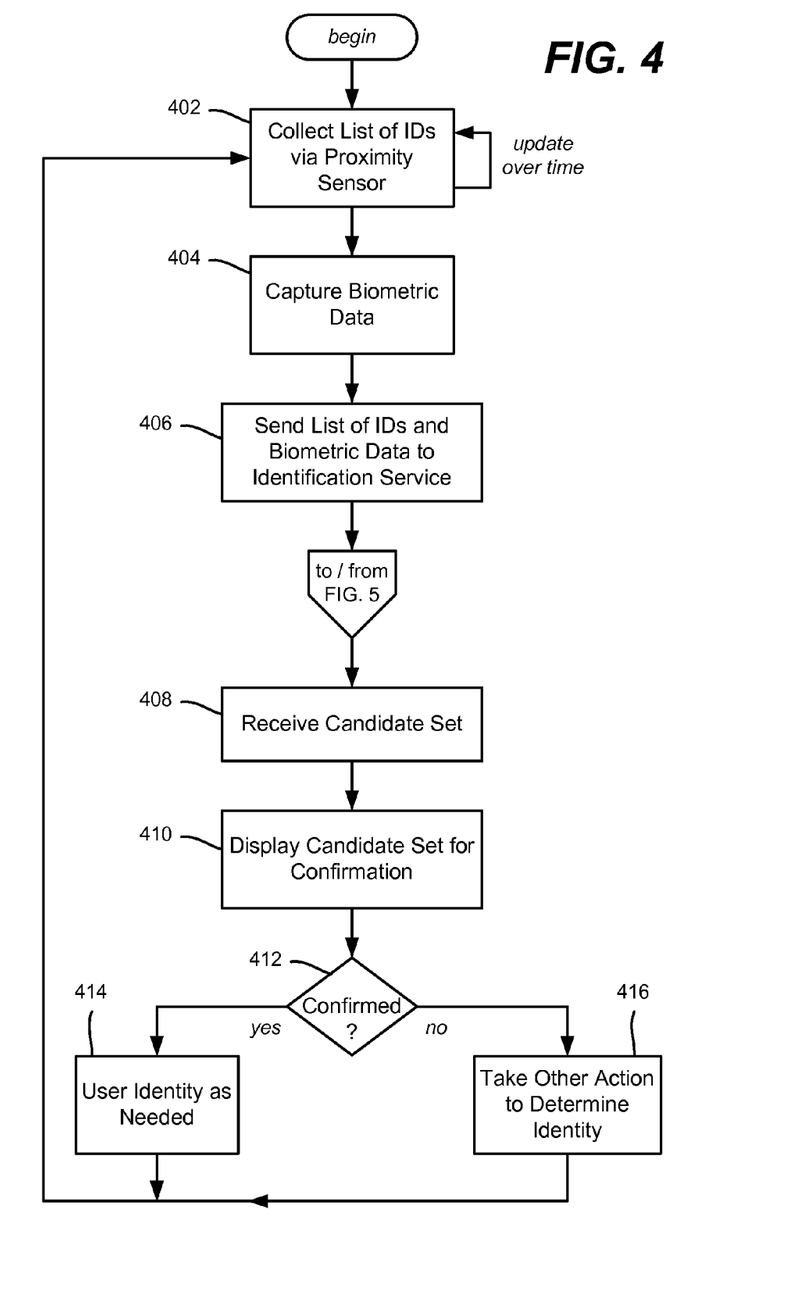
FIG. 4 is a flow diagram representing example steps that may be taken to collect and use proximity data and biometric data for biometric-based identification, according to one example implementation.
Figure 5:
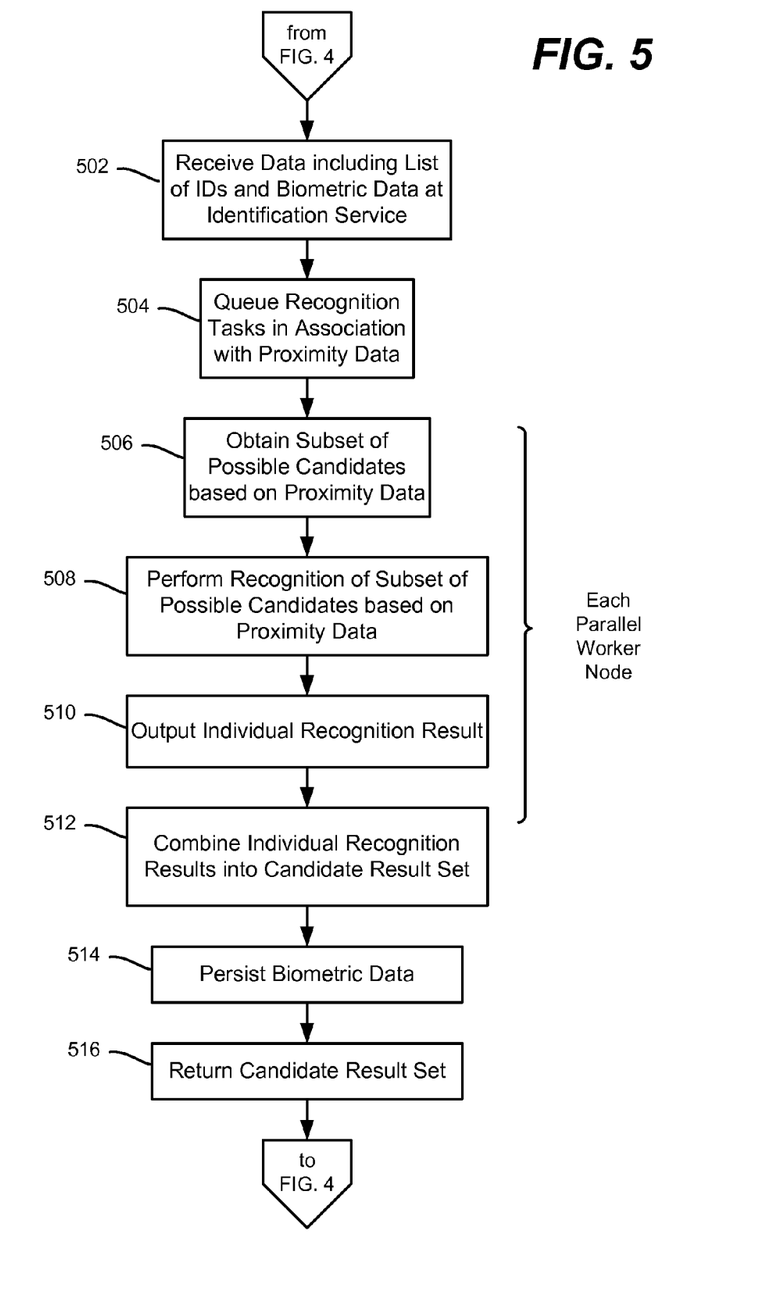
FIG. 5 is a flow diagram representing example steps that may be taken to process biometric data based upon proximity data to perform biometric-based identification, according to one example implementation.

By way of summary, FIGS. 4 and 5 show example steps of a requesting entity (FIG. 4) such as a merchant, and an identification service (FIG. 5). Step 402 of FIG. 4 represents the requesting entity collecting the IDs of the devices of users via the proximity sensors. As described herein, this serves as the information used to narrow the field of possible candidates (e.g., customers) to those who are nearby, thereby improving biometric recognition accuracy. This may be updated over time, such as regularly, e.g., as new users come into proximity and other users go out of proximity, with a decay function, heuristics or the like used to gradually remove users from the list.

Step 404 represents capturing the biometric data. This may be on demand (e.g., as a user approaches a point-of-sale terminal the camera is triggered), or may be time based, e.g., the video camera is always recording, but the capture of the biometric data for transaction corresponds to a time window from a number of seconds before a transaction started to some number of seconds after the transaction completed. Step 406 represents sending the list of IDs and the biometric data to an identification service, which is processed as described below with reference to FIG. 5.

Step 408 represents receiving the candidate set from the service. In this example, the candidate set corresponds to a ranked list of most likely (registered) users given who are in proximity and based upon the facial recognition thereof. It is possible that the returned candidate set is empty, e.g., no nearby user met a threshold recognition confidence.

In the example of FIG. 4, human confirmation is desired, and thus step 410 displays images or the like of the candidates to a human, such as a cashier. If the identity is confirmed at step 412, the identity may be used as desired at step 414, e.g., to complete a transaction. Otherwise, step 416 represents taking some other action to determine the identity, e.g., asking for a payment card, government ID, and so forth.

FIG. 5 begins at step 502 where the data is received from a requesting entity, such as the merchant exemplified in FIG. 4. As described in the above-example implementation, step 504 represents the master node queuing the recognition tasks, e.g., video frames, which may be full frames or processed into sub-frames, for worker nodes to process as generally described above.

Steps 506, 508 and 510 are performed in parallel by each worker node that dequeues a recognition task. Step 506 represents querying the local database to find the stored data for the subset of (at least one) candidates who the proximity data identified as being present. Step 508 represents performing the recognition, and step 510 represents outputting the individual recognition result for this frame or sub-frame, which may be a ranked list of candidates, a list of candidates and associated probability data for each, and so forth. At this time the worker node may dequeue another task, which may be from an entirely different requesting entity.

Step 512 represents the master node combining the individual results into a (final) candidate result set. Step 514 represents persisting the biometric data, e.g., saving the video to a service for auditing as described above. The candidate result set is returned at step 516. Note that the result set may be processed to include images of each candidate, a link to the persisted video and so forth.

Example Operating Environment

Figure 6:
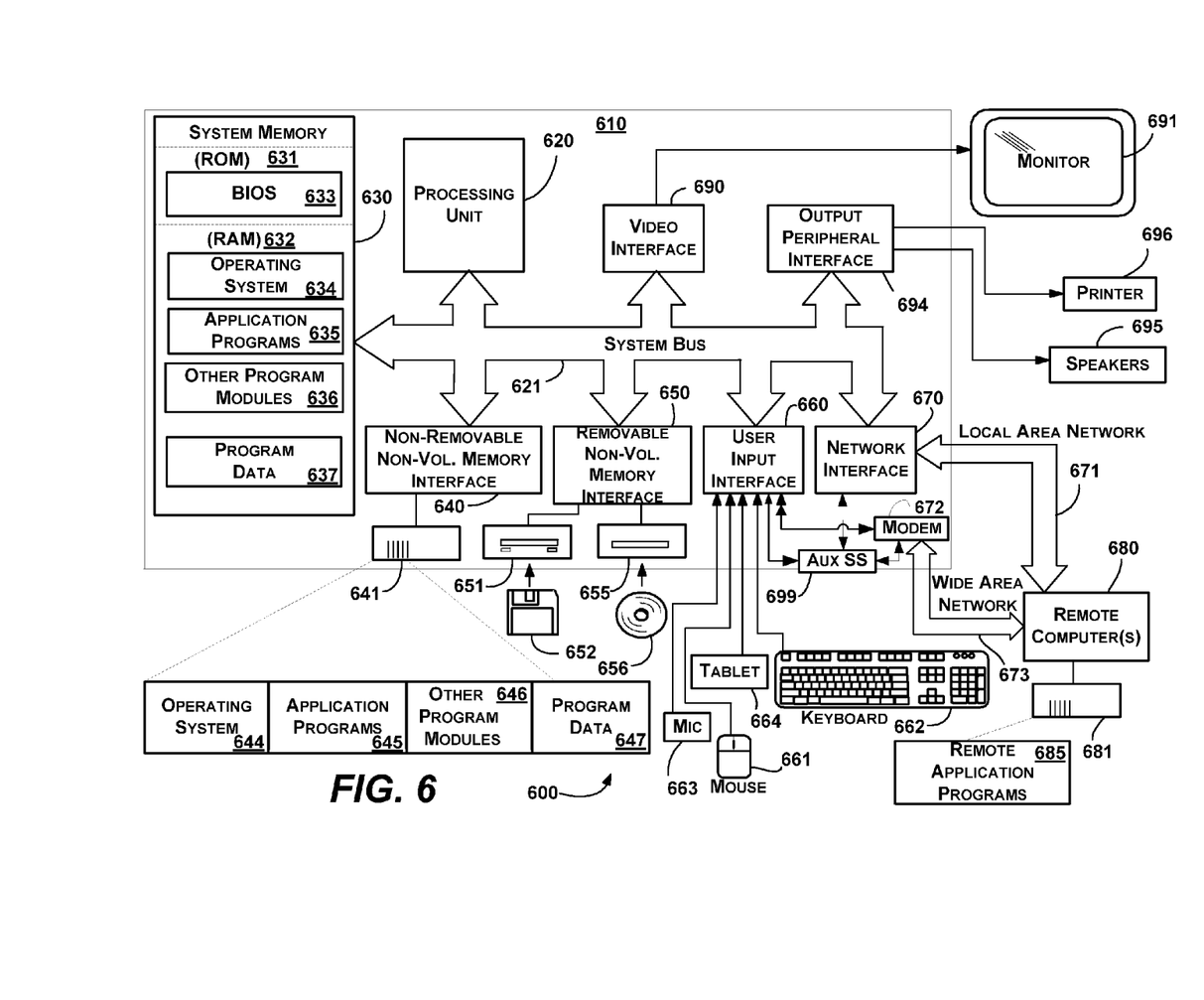
FIG. 6 is a block diagram representing an example computing environment into which aspects of the subject matter described herein may be incorporated.

FIG. 6 illustrates an example of a suitable computing and networking environment 600 into which the examples and implementations of any of FIGS. 1-3 may be implemented, for example. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
providing, by a processing device, personal identity-related information, including obtaining sensed proximity-based data corresponding to a first set of one or more user devices, obtaining sensed biometric data corresponding to a second set of one or more users within a range of a biometric sensing mechanism, using the proximity-based data to reduce a set of candidate persons having stored biometric data to a reduced subset, and performing machine recognition that evaluates the sensed biometric data against stored biometric data of candidate persons in the reduced subset to produce a final candidate set corresponding to at least one candidate person's identity.

2. The method of claim 1 wherein obtaining the sensed proximity-based data and obtaining the sensed biometric data comprises receiving at least one communication from a requesting entity, and further comprising, returning the final candidate set to the requesting entity.

3. The method of claim 2 wherein the identity-related information is used in a commercial transaction, and wherein the final candidate set comprises a representative image of each candidate useable for human confirmation.

4. The method of claim 1 wherein the identity-related information is used to obtain personalization information.

5. The method of claim 1 wherein the sensed biometric data corresponds to a video clip, and further comprising, communicating the video clip to a video server for storage and auditing.

6. The method of claim 1 further comprising, enrolling users to obtain information corresponding to the stored biometric data of the candidate persons.

7. The method of claim 1 wherein the sensed biometric data corresponds to a set of video frames, and wherein performing the machine recognition comprises performing face recognition, including processing temporally-separated or spatially-separated frames, or both, to obtain individual recognition results, and processing the individual recognition results into the final candidate set.

8. The method of claim 7 wherein at least some of the processing of the temporally-separated or spatially-separated frames, or both, is performed in parallel.

9. In a computing environment, a system comprising:
at least one processing device;
a memory communicatively coupled to the at least one processing device;
a proximity sensing mechanism implemented on the at least one processing device and configured to sense identifying information of one or more user devices within range of the proximity sensing mechanism;
a biometric sensing mechanism implemented on the at least one processing device and configured to sense biometric data of one or more users within range of the biometric sensing mechanism; and
a processing mechanism implemented on the at least one processing device and configured to provide the identifying information of the one or more user devices and the biometric data of the one or more users to an identification service that machine recognizes the biometric data into a candidate set corresponding to at least one candidate by using the identifying information of the one or more user devices to assist in the recognition, including to narrow a field of possible candidates based on the identifying information prior to performing biometric recognition on the sensed biometric data, the processing mechanism further configured to receive the candidate set and to output information corresponding to the candidate set.

10. The system of claim 9 further comprising:
a display coupled to the processing mechanism, wherein the output information corresponding to the candidate set comprises visible representations of each candidate of the candidate set rendered on the display for interaction with a human.

11. The system of claim 9 wherein the proximity sensing mechanism is configured to sense short-range wireless communication data, near field communication data, GPS data, Wi-Fi data or RFID data, or any combination of short-range wireless communication data, near field communication data, GPS data, Wi-Fi data, or RFID data.

12. The system of claim 9 wherein the proximity sensing mechanism is configured to sense encrypted identification data that is used to identify one or more users in proximity to the proximity sensing mechanism, in which the encrypted identification data is protected via an encryption scheme.

13. The system of claim 12 wherein the encrypted identification data corresponds to a random identifier received in an advertisement phase that is used in a secondary phase to connect to a device to request an encryption of the device's identifier.

14. The system of claim 9 wherein the biometric sensing mechanism is configured to capture at least one of face data, iris data, retina data, or voice data.

15. The system of claim 9 wherein the biometric data comprises video frames, and wherein the identification service is configured to receive the biometric data corresponding to the video frames and the identifying information, and to provide the video frames and the identifying information to a plurality of backend or cloud node computers, or both, the identifying information providing a reduced subset relative to a set of candidate persons having stored biometric data, each backend computer or cloud node computer configured to perform face recognition using a subset of the video frames and the reduced subset, the identification service combining individual face recognition results from each backend computer or cloud node computer into the candidate set for returning to the processing mechanism.

16. The system of claim 15 wherein each video frame is queued for processing by a backend computer or cloud node computer into an individual face recognition result.

17. One or more computer storage media having computer-executable instructions, which when executed by a computer cause the computer to perform steps, comprising:
determining an identity of a customer in a commercial transaction without active identification effort by the customer, including obtaining biometric data from the customer without action by the customer directed towards providing the biometric data, obtaining a set of possible customers based upon secondary sensing, and machine processing the biometric data over the set of possible customers to determine or assist in determining the identity of the customer.

18. The one or more computer storage media of claim 17 having further computer-executable instructions comprising, outputting a result set comprising images of one or more candidate customers for confirmation of the identity of the customer by a human confirmer.

19. The one or more computer storage media of claim 17 wherein the biometric data comprises video data, and wherein machine processing the biometric data comprises performing separate parallel facial recognition operations on temporally separated frames or sub-frames, or on both temporally separated frames and sub-frames.

20. The one or more computer storage media of claim 17 wherein the biometric data comprises video data, and having further computer-executable instructions comprising, storing at least part of the video data in association with data that identifies the commercial transaction.

* * * * *